United States Patent [19]

Evers

[11] Patent Number: 4,943,443

[45] Date of Patent: Jul. 24, 1990

[54] FOAMABLE ALCOHOL PRODUCT AND PROCESS OF PRODUCING A FOAMABLE ALCOHOL PRODUCT

[76] Inventor: Paulus H. J. M. Evers, Creytestraat 11, 5841 AL Oploo, Netherlands

[21] Appl. No.: 182,972

[22] Filed: Apr. 18, 1988

[30] Foreign Application Priority Data

Apr. 22, 1987 [NL] Netherlands .......................... 8700955

[51] Int. Cl.$^5$ .......................... A23L 1/19; A23C 1/156
[52] U.S. Cl. .................................. 426/569; 426/592; 426/613; 426/570; 426/565; 426/572
[58] Field of Search ............... 426/592, 564, 565, 566, 426/567, 568, 569, 570, 571, 572, 613

[56] References Cited

U.S. PATENT DOCUMENTS 3,519,440  7/1970  Staackmann .............................. 99/

FOREIGN PATENT DOCUMENTS 0177077  9/1986  European Pat. Off. .
3123972  6/1981  Fed. Rep. of Germany .
WO86/00196  of 0000  PCT Int'l Appl. .

OTHER PUBLICATIONS

Journal Dairy Foods (Feb., 1986) p. 30.
Effect of Alcohol Content on Emulsion Stability of Cream Liqueurs *Food Chemistry*, vol. 18, pp. 139–152 (1985).
"Encyclopedia of World Cookery", E. Campbell, (1968 ed.) p. 224.
"Chemical Abstracts", vol. 87, No. 25 (Dec. 19, 1977) p. 564.

*Primary Examiner*—Jeanette Hunter
*Attorney, Agent, or Firm*—Kirkland & Ellis

[57] ABSTRACT

A stable foamable product consisting of a homogenized mixture of fat, protein, water, alcohol, calcium and foam stabilizing agents such as polyphosphates and lactates. The process for preparing such a foamable alcohol product is also disclosed.

18 Claims, No Drawings

FOAMABLE ALCOHOL PRODUCT AND PROCESS OF PRODUCING A FOAMABLE ALCOHOL PRODUCT

BACKGROUND OF THE INVENTION

1. Field of the Invention

This invention relates to a foamable alcohol product existing as a stable emulsion containing alcohol, fat and protein and to a process for preparing such a product.

2. Description of the Art

It has heretofore not been possible to foam a product containing a combination of alcohol, fat, and protein which is homogenized to form an emulsion because of the destabilizing effect of alcohol on the foam. Prior art foam stabilizing agents that have been successfully used with emulsions containing fat and protein such as whipped cream, have been unsatisfactory in producing a stable foam in the presence of alcohol in the emulsion.

U.S. Pat. No. 3,519,440, issued Jul. 7, 1970, describes a product having fat and protein in emulsion form which produces a stable foam. The product comprises a homogenized mixture of fat, protein and an emulsifying system composed of fatty acid glyceride and propylene glycol fatty acid ester. The emulsifying system according to the description in the patent is critical in obtaining a stable foam from the product.

German Pat. No. 3,123,972 describes a product containing whipped cream, alcohol, pectins and other ingredients. When the whipped cream is added to the mixture of alcohol, pectins and other ingredients, a coagulate is formed. However, the coagulate cannot be foamed.

The *Encyclopedia of World Cookery* describes a recipe for Syllabub, an alcoholic beverage composed of sherry, cream, milk, egg whites, sugar and lemon juice. Although the recipe produces a foamable product containing alcohol, the product is perishable because it is not homogenized and therefore is not commercially practicable.

Accordingly, a primary object of the present invention is to provide a stable, foamable alcohol-containing emulsion.

Another object is to provide an alcohol containing foamable product with commercial applicability.

Yet another object is to produce a stabilized aerosol alcohol containing product.

A still further object is to provide a process for producing a foamable alcohol containing product.

SUMMARY OF THE INVENTION

The foregoing and other objects, advantages and features of the invention may be achieved by a foamable composition comprising a novel foam stabilizing agent, an emulsion containing alcohol, fat, and protein and a calcium source. More particularly, it has been found that polyphosphates, lactates and combinations thereof in the presence of a calcium source are excellent foam stabilizing-- agents--.for--...a foamable emulsion containing alcohol, fat and protein. It has further been discovered that the foregoing foamable product can be produced by emulsifying, preferably by homogenization, a mixture of protein, fat, calcium source, water and foam stabilizing agents: cooling the emulsified mixture and adding an aqueous alcohol composition thereto. If desired, sweeteners, colorings and flavoring agents may be added to the foamable product.

DETAILED DESCRIPTION OF THE INVENTION

Products containing alcohol, fat and protein in emulsion form are not readily foamable due to the destabilizing effect of alcohol on the foam. Known foam stabilizing agents such as polypropylene glycolalginate and pectin are ineffective in producing foam stability in an product containing alcohol, fat, and protein which is foamed.

This invention relates to a foamable product containing alcohol, fat, and protein which produces a stable foam. It has been found that a stable foam can be produced by the addition of polyphosphates and lactates as foam stabilizing agents an emulsion containing alcohol, fat and protein in the presence of a calcium source. In the preferred form, the foamable product consists of an emulsion of fat, protein, water, alcohol, emulsifiers, a calcium source, and foam stabilizing agents. In addition, supplemental foam stabilizing agents, sweeteners, flavoring agents and colorings may also be added to the foamable product in its preferred form.

The fat used in the emulsion may be chosen from a wide variety of fats such as milkfat coconut oil, cotton seed oil, peanut oil, and palm oil. The fat chosen should have a low melting point, preferably below 32° C. The preferred fat to be used in accordance with this invention is coconut oil.

The protein used in the foamed product may be casein, sodium caseinate, and soya protein. The preferred protein to be used in accordance with this invention is sodium caseinate.

The alcohol used in accordance with this invention may be an aqueous alcoholic composition such as an alcoholic beverage containing ethanol. Possible alcoholic beverages include wine, liqueurs, melasse alcohol, vodka and brandy. Liqueurs are especially preferred as the aqueous alcohol composition.

The emulsifiers used in the foamable product in its preferred form are monoglycerides. Suitable monoglyarides include a whole range of monoglyarides used in food products in amounts up to 40g/kg of the final product. Especially preferred monoglyarides are lactic acid esters of monoglyarides and acetic acid esters of monoglyarides.

The calcium source used in accordance with this invention may be cream product, liquid cream, milk power or milk. Usage of cream is preferred to other possible calcium sources in order to obtain a creamy taste in the foamable product.

Polyphosphates and lactates can be used individually or in combination as the foam stabilizing agent to produce a stable foam in an alcohol containing product.

The polyphosphates used in accordance with this invention as foam's stabilizing agents may be all possible polyphosphates used in food products in an amount of 0.01–4g/kg of the final product. The especially preferred polyphosphate is sodium hexametaphosphate.

The lactates used as the foam stabilizing agents in accordance with this invention are obtained by separation of milk. The preferred method of obtaining lactates is by ultrafiltration of milk. The lactates may be all possible lactates, preferably calcium lactates.

The supplemental foam stabilizing agents which may be added to the foamable product in accordance with this invention include the agents used in non-alcoholic polyprophylene glycolagenate, pectin, up to an amount of 0.2–5g/kg of the final product, pectin, up to an amount of 0.1–5g/kg of the final product. Polypropylene glycolagenate and pectin are especially preferred.

In addition, flavoring agents, sweeteners and colorings may be added to the foamable product as desired. Flavoring agents include chocolate, cocoa, vanilla, caramel and other flavors. Possible sweeteners to be used include glucose, sacchrose, dextrose, corn sugar, corn syrup, as well as artificial sweeteners such as saccharin and apartame. Dyes are added to achieve a desired appearance in the foamable product.

The foamed produce may be used as a topping composition on drinks, beverages and other applications including but not limited to applications in which whipped cream is used.

The invention also relates to the process of preparing an alcohol, fat and protein containing product which is foamable. The process entails mixing approximately 0.5–50g/kg of the final product of calcium with 1–70 g/kg of the final product of protein, 0.30–400g/kg of the final product of fat and 1–70g/kg of the final product of foam stabilizers. The mixture is emulsified, preferably by homogenization at a pressure of approximately 25–150kg/cm$^2$ and a temperature of approximately 60°–110° C. to form an emulsion. Fifty degrees is the preferred temperature. Where pasteurization conditions are employed the emulsion is also pasteurized.

The emulsion is cooled to below 5° C. Sweeteners are then added to the cooled homogenized mixture. Following the addition of sweeteners, a mixture containing approximately 20–70 percent of alcohol and 30–80 percent of water is added. If desired, flavor and colorings may be added to the foamable product to enhance the flavor and appearance of the foamable product. The pH of the foamable product is adjusted to a value of 5.5 by gluconolactone. The pH is further lowered to a value below 5 by usage of various acids such as tartaric acid, ascorbic acid and malic acid, individually or in combination. These acids provide sharp pH reduction without imparting an acetic taste to the foamable product.

The foamable product formed by this method can be foamed by various means, including but not limited to manual whipping devices, electric whipping device or by a aerosol container. If the foamable product is foamed by an aerosol container, the foamable product is packed in an aerosol can. The aerosol can is pressurized with any propellant such as nitrogen dioxide gas.

The foam resulting by the foaming of the foamable product is stable in a temperature range of approximately −8° C. to approximately 50° C. when the alcohol content is below 40 volume percent. The foam is acid stable down to a pH value of about 2.

If greater stability in the foam is desired, such as in instances in which the foamable product is to be on hot drinks or beverages, the foamable product may be further homogenized. It has been found that when the final foamable product is subject to homogenization at a pressure of 200 to 300 kg/cm$^3$ and at a temperature below 20° C., greater foam stability is obtained.

EXAMPLE

A foamable alcohol product was prepared from the following groups of ingredients.

|  | grams |
| --- | --- |
| Group 1 | |
| Distilled monoglyceride | 1.80 |
| Lactic acid ester of monoglyceride | 9.50 |

-continued

|  | grams |
| --- | --- |
| Acetic acid ester of monoglyceride | 6.80 |
| Coconut fat (melting point 31-32° C.) | 67.50 |
| Group 2 | |
| Cream Powder (55% fat) | 45.00 |
| Sodium Caseinate | 10.89 |
| Antioxidants butylated hydroxyanisol + butylated hydroxybluene | 0.10 |
| Water | 200.00 |
| Group 3 | |
| Water | 160.00 |
| Lactate and polyphosphates | 0.54 |
| Trisodium citrate | 0.90 |
| Propylene glycolalginate (low viscous) | 1.26 |
| Propylene glycolalginate (high viscous) | 0.27 |
| High molecular citric pectin | 1.80 |
| Group 4 | |
| Glucose | 40.50 |
| Saccharose | 180.00 |
| Corn Sugar (hydrolyold starch) | 180.00 |
| Group 5 | |
| Alcohol 96% | 123.90 |
| Water | 157.00 |
| Flavor and Color | suitably added |
| Group 6 | |
| Gluconolactone | 3.00 |
| Group 7 | |
| Tartaric acid, ascorbic acid, malic acid | 0.10 |

The components of group 1 are heated to 80° C. with intense mixing. The same procedure is followed with the components of group 2. Subsequently the components of groups 1 and 2 are mixed at 80° C. The mixture of components of group 1 and group 2 is homogenized at a pressure of 180 kg/cm$^2$ and at a temperature of 80° C.

The components of group 3 are then added, and the mixture is mixed at 85° C. for a time period equal to or exceeding 30 minutes. Upon completion of the mixing, the sweeteners of group 4 are added. The mixture is then cooled to below 5° C.

When the mixture attains a temperature below 5° C., the alcohol, water, flavor and color of Group 5 are added. Following this addition the pH of the mixture is lowered to a value of approximately 5.5 by adding component 6. The pH is reduced further to below a level of approximately 5.0 by the addition of one of components 7 or a mixture thereof.

From the foregoing description, one skilled in the art can easily ascertain the essential characteristics of this invention and without departing from the spirit and scope thereof can make various changes and modifications of the invention to adapt it to various usages and conditions.

I claim:

1. A foamable alcoholic product comprising an emulsified mixture of effective amounts of a calcium source, a fat, protein, an aqueous alcohol composition, and a foam stabilizing agent selected from the group consisting of polyphosphates, lactates and mixtures thereof, whereby the emulsified mixture may be foamed to produce a foamed alcoholic product.

2. A foamable product, as claimed in claim 1, and further comprising a supplemental foam stabilizing agent chosen from the group consisting of polypropylene glycolalginate, pectin and milk proteins.

3. A foamable product, as claimed in claim 1, wherein the calcium source is selected from the group consisting of cream powder, liquid cream, milk and milk powder.

4. A foamable product, as claimed in claim 3, wherein the calcium source is liquid cream.

5. A foamable product, as claimed in claim 1, wherein the aqueous alcoholic composition is an alcohol containing beverage.

6. A foamable product, as claimed in claim 1, which is homogenized.

7. A foamable product, as claimed in claim 1, which is pasteurized.

8. A process for producing a stable foamable alcohol, fat and protein containing emulsion comprising mixing an effective amount of a calcium source, protein, fat, water and a foam stabilizing agent selected from the group consisting of polyphosphates, lactates and mixtures thereof; emulsifying the mixture; cooling the mixture; adding an aqueous alcoholic composition thereto, and foaming said mixture containing said alcoholic composition to form a foamed alcoholic product.

9. A process, as claimed in claim 8, wherein the emulsified mixture is cooled to below about 5° C.

10. A process, as claimed in claim 8, wherein sweeteners, colorings, and flavors are added after the addition of the aqueous alcoholic composition.

11. A process, as claimed in claim 8, wherein the calcium source is selected from the group consisting of cream powder, liquid cream, milk powder and milk.

12. A process, as claimed in claim 8, wherein the foam stabilizing agent as selected from the group consisting of polyphosphates, lactates or combinations thereof.

13. A process, as claimed in claim 8, wherein the aqueous alcoholic composition is an alcohol containing beverage.

14. A process, as claimed in claim 8, wherein the pH value of the product is lowered after the addition of the aqueous alcoholic composition.

15. A process, as claimed in claim 14, wherein the pH value is lowered to a value of approximately 5.5 by addition of gluconolactone.

16. A process, as claimed in claim 15, wherein the pH value is lowered below the value of 5 by addition of an acid selected from the group consisting of tartaric acid, ascorbic acid. and malic acid.

17. A process, as claimed in claim 8, wherein the mixture is emulsified by homogenization.

18. A process, or claimed in claim 17, wherein the mixture is homogenized under condition of pasteurization.

* * * * *